United States Patent [19]

Den Dekker

[11] Patent Number: 5,674,381

[45] Date of Patent: Oct. 7, 1997

[54] ASSEMBLY OF FILTERING APPARATUS AND REPLACEABLE FILTER; AND FILTERING APPARATUS AND FILTER FOR USE THEREIN

[75] Inventor: Dirk Jan Marinus Den Dekker, CM Bergen, Netherlands

[73] Assignee: Doctro A.V.V., Aruba, Netherlands

[21] Appl. No.: 532,618

[22] PCT Filed: Mar. 29, 1994

[86] PCT No.: PCT/NL94/00067

§ 371 Date: Nov. 29, 1995

§ 102(e) Date: Nov. 29, 1995

[87] PCT Pub. No.: WO94/22551

PCT Pub. Date: Oct. 13, 1994

[30] Foreign Application Priority Data

Mar. 29, 1993 [NL] Netherlands ............... 9300554

[51] Int. Cl.[6] .............. B01D 17/12; B01D 35/14
[52] U.S. Cl. ............... 210/85; 55/270; 55/274; 210/138; 210/143
[58] Field of Search ............... 210/85, 87, 91, 210/94, 143, 138, 282; 55/270, 271, 274, DIG. 2, DIG. 34; 235/487, 488, 491, 492, 493

[56] References Cited

U.S. PATENT DOCUMENTS

| | | | |
|---|---|---|---|
| 4,654,140 | 3/1987 | Chen | 210/91 |
| 5,192,424 | 3/1993 | Beyne et al. | 210/91 |
| 5,354,979 | 10/1994 | Adelson et al. | 235/491 |
| 5,536,395 | 7/1996 | Kuennen et al. | 210/87 |

FOREIGN PATENT DOCUMENTS

| | | | |
|---|---|---|---|
| 0 202 201 | 11/1986 | European Pat. Off. | |
| 31 26 850 | 3/1982 | Germany | |
| 4284807 | 10/1992 | Japan | 55/274 |

*Primary Examiner*—Joseph W. Drodge
*Attorney, Agent, or Firm*—Darby & Darby

[57] ABSTRACT

A filtering apparatus and replaceable filter assembly including an electronic filter identification system having an electronic label on the filter and a read-out mechanism on the filtering apparatus. The read-out mechanism is connected to a control unit of the filtering apparatus and the control unit is influenced by the read-out mechanism. The control unit may be actuable only upon disposing a filter in the filtering apparatus having a proper or predetermined electronic label. The filter identification system may also be interactive. The electronic label on the filter includes a read/write memory which can store the number of operating hours of the filter.

8 Claims, 1 Drawing Sheet

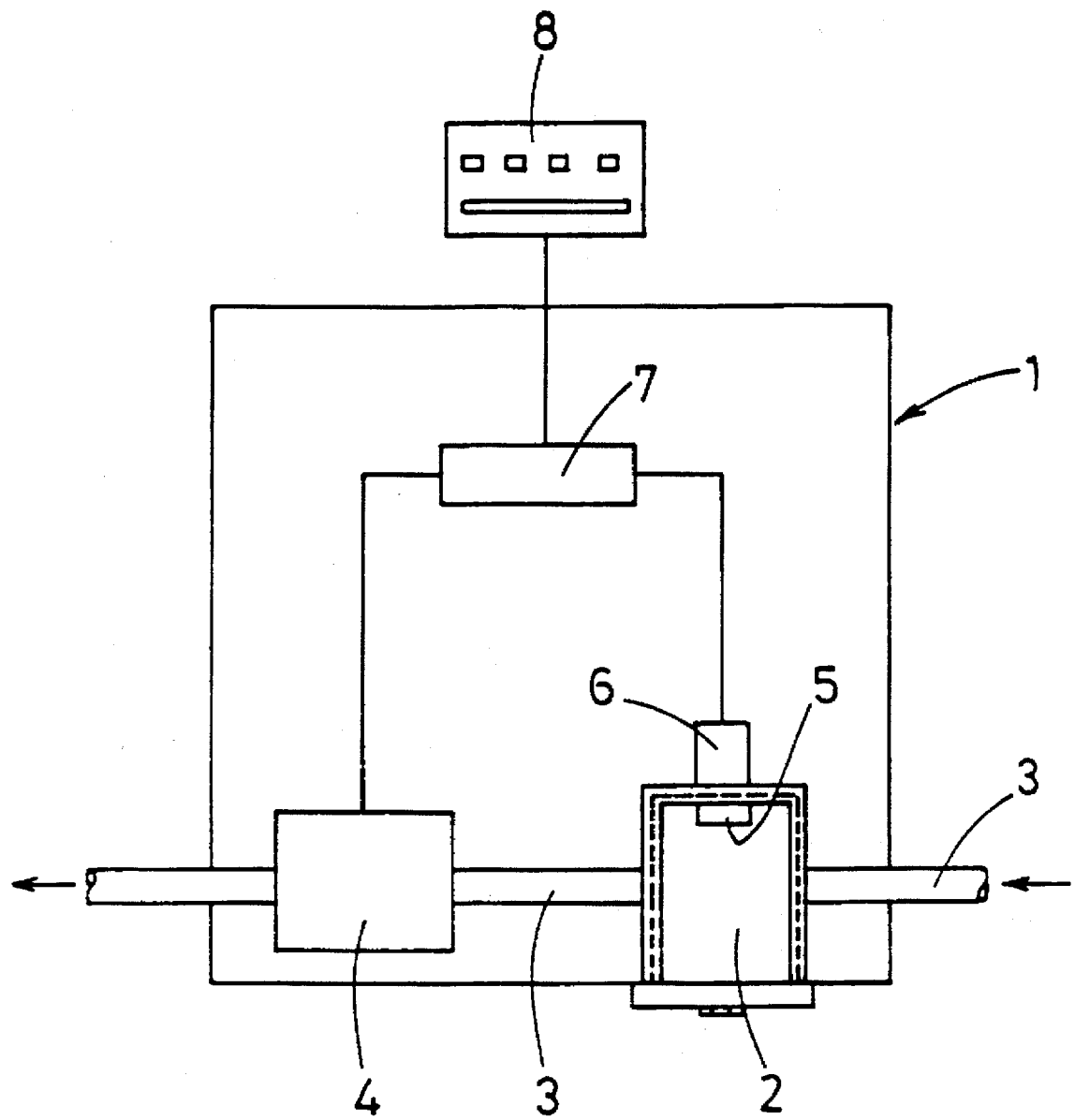

ASSEMBLY OF FILTERING APPARATUS AND REPLACEABLE FILTER; AND FILTERING APPARATUS AND FILTER FOR USE THEREIN

The invention relates to an assembly of a filtering apparatus and a replaceable filter.

In various types of filtering apparatuses, such as industrial exhausters, vacuum cleaners, filtering devices in lubrication systems etc., the filter should be replaced periodically because clogging will degrade its operation. When it is replaced several things can go wrong, such as incorrect fitting, fitting of a wrong or unapproved type and the like, which jeopardizes the correct operation of the filtering apparatus or even personal safety.

It is the object of the invention to provide an assembly of a filtering apparatus and a replaceable filter in which this disadvantage is removed in an effective way.

For this purpose, the assembly according to the invention is characterized by an electronic filter identification system including an electronic label on the filter and read-out means on the filtering apparatus.

Due to these features it is permitted that the read-out means checks the correct fitting of a proper filter type by means of the label thereby avoiding mistakes.

It is for example possible that the read-out means is connected to a control unit of the filtering apparatus and the control unit is influenced by the read-out means, in which case preferably the control unit is only actuable upon disposing a filter in the filtering apparatus having a proper label. In this way it is impossible to operate the filtering apparatus together with an improper filter, thus avoiding undesirable or even dangerous situations.

In a further development of the invention, the filter identification system may be interactive permitting for example the provision of a label with a read and write memory adapted to store the number of operating hours of the filter and to switch off the filtering device if the maximum permitted number of operating hours has been reached. This prevents the filter from being used too long which would endanger the proper operation of the filter. Since the label in the filter itself counts the number of operating hours, a correct counting is maintained also when the filter is removed from the filtering apparatus and is fitted again in the same or another filtering apparatus, so that a timely warning for the end of the operating time is ensured.

Preferably, the filtering apparatus comprises an indicating means such as a display or indicator lamps of a control panel, for showing information on the filter.

With this indicating means an operator can be provided with information received by the read-out means of the filter label, for example the fitting of an incorrect filter, or the attainment of the maximum operating time, so that the necessary actions can be taken immediately.

The invention includes both the assembly of a filtering apparatus and a filter, and the filtering apparatus and the filter having the features as mentioned separately.

The invention will hereafter be elucidated with reference to the drawing showing a substantially simplified diagram of an exemplary embodiment of the invention.

The only FIGURE of the drawing shows a filtering apparatus indicated by reference numeral 1 and accommodating therein an exchangeable filter 2. The filtering apparatus 1 may be part of a great number of different types of apparatus, such as for instance industrial exhausters to be used in welding operations for example, in vacuum cleaners or also in fluid circuits in which a fluid is filtered during each circulation. The fluid includes both air, gas and liquids. The filter 2 will preferably be a mechanical filter in which the fluid is guided through a porous material or a material structure having small passage openings separating solid matter from the fluid. For this purpose, the drawing shows a fluid line 3 extending through the filter 2, and a pressure or vacuum source 4, for example a pump, for forcing the fluid through the filter 2.

The replaceable filter 2 has an electronic label 5 to be read out by a read-out means 6 which is mounted in the filtering apparatus 1 and in this case being connected to a central control unit 7 controlling the operation of the filtering apparatus 1 or the machine accommodating the filtering apparatus 1 and to which the pressure or vacuum source 4 is connected. The FIGURE also shows a control panel 8 connected to the control unit 7.

The electronic label 5 comprises information on the filter 2 which is readable by the read-out means 6. Label 5 and read-out means 6 together form an electronic identification system which may be provided in several embodiments. In a simple embodiment one may use for example resonance circuits, magnetic strip cards or optical cards, in which systems the label can only act as a transmitter and the read-out means as a receiver. In more sophisticated systems there may be an interaction of the label and read-out means so that both the label and read-out means are transmitter and receiver at the same time. In these identification systems use can be made of a chip card having a small piece of an EEPROM (a read and write memory remaining in tact without electric supply), a "PIT" (programmable identification tag) in which a chip card is used, but in which both the energy and the information is transmitted a distance without contact, or a so-called smart card in which the memory of a chip card is extended to a complete micro controller able to carry out full computations.

All systems are able to transmit information from the label to the read-out means in the filtering apparatus. As a result it is possible to use the read-out means to check the fitting of the correct type of filter in the filtering apparatus. The program of the filtering device may be such that, if the right filter is not fitted, the control unit 7 is inhibited and the filter apparatus or the machine incorporating said filtering apparatus is prevented from being switched on. Consequently, the personal safety and the correct operation of the apparatus is secured. It might be possible to have the control panel 8 indicate that another filter should be fitted.

When an interactive system is used, the features of the filter identification system may be extended substantially. For example, the actual operating time of the filter may be stored in the label 5 of the filter 2 which will prevent the filter from being used too long. The user may be warned by an indication on the control panel 8 or the apparatus may be switched off if the maximum permitted operating time is exceeded. During the use of the filter, the operator may be kept informed of the number of operating hours of the filter 2 through the operating panel 8. Of course, other exchanges of information within the interactive system are conceivable.

Particularly, with filters which are used for filtering danger substances, for example asbestos, it may be useful to provide the label 5 of the filter 2 with a copy protection so that only approved filters adapted to the requirements may be used and other filters will be refused by the filtering apparatus 1.

The invention is not restricted to the embodiment shown in the drawing and described herein before which may be varied in different manners within the scope of the invention.

A further extension of the embodiment includes an interactive identification system to store data from the filtering apparatus in the label, data may for example relate to substances which are retained within the filter during filtration. These data may be read out with a portable unit in a waste treatment works in order to determine the best way to dispose of the filter as waste.

I claim:

1. An assembly of a filtering apparatus and a replaceable filter which comprises an electronic filter identification system, including an electronic label on the filter and read-out means on the filtering apparatus, said electronic label comprising means including a read and write memory adapted to count and store a number of actual operating hours of the replaceable filter.

2. The assembly of claim 1, wherein the read-out means is connected to a control unit of the filtering apparatus, said control unit being responsive by the read-out means.

3. The assembly of claim 2, wherein the control unit is actuable only upon said filter being disposed in the filtering apparatus which has a predetermined electronic label.

4. The assembly of claim 1, wherein the filter identification system is interactive.

5. The assembly of claim 1, wherein the filtering apparatus comprises an indicating means including a display or indicator and a control panel, for showing information on the filter.

6. The assembly of claim 1, wherein the label comprises means allowing use or refusal of the filter by the filtering apparatus.

7. A filtering apparatus adapted to receive a replaceable filter wherein said apparatus comprises read-out means adapted to cooperate with an electronic label on the filter to form an electronic filter identification system, said electronic label comprising means including a read and write memory adapted to count and store a number of actual operating hours of the replaceable filter, said read-out means adapted to respond to said memory means to effect at least one of providing a warning or actuating shutdown of flow through the filter.

8. A filter adapted to be placed in a filtering apparatus wherein said filter comprises an electronic label adapted to cooperate with read-out means on the filtering apparatus to form an electronic filter identification system, said electronic label comprising means including a read and write memory adapted to count and store a number of actual operating hours of the replaceable filter.

* * * * *